United States Patent [19]
Francois

[11] 4,082,120
[45] * Apr. 4, 1978

[54] METHOD OF PRODUCING TUBULAR LATTICE REINFORCEMENT FOR REINFORCED CONCRETE TUBULAR PIPE HAVING A SOCKET AT ONE END THEREOF

[75] Inventor: Maurice Francois, Saint Dizier, France

[73] Assignee: Trefilunion, Paris, France

[*] Notice: The portion of the term of this patent subsequent to May 11, 1998, has been disclaimed.

[21] Appl. No.: 538,479

[22] Filed: Jan. 3, 1975

Related U.S. Application Data

[60] Division of Ser. No. 298,321, Oct. 17, 1972, which is a continuation of Ser. No. 109,244, Jan. 25, 1971, abandoned, which is a division of Ser. No. 808,252, Mar. 18, 1969, Pat. No. 3,578,036.

[30] Foreign Application Priority Data

Mar. 22, 1968 France .............................. 68.144908

[51] Int. Cl.² .............................................. B21F 27/22
[52] U.S. Cl. ..................................... 140/107; 138/175
[58] Field of Search ...................... 140/3, 107; 72/355, 72/393; 138/155, 174, 175

[56] References Cited

U.S. PATENT DOCUMENTS

| | | | |
|---|---|---|---|
| 1,158,415 | 10/1915 | Boyle ................................... | 138/175 |
| 1,900,145 | 3/1933 | Whiting ................................ | 138/175 |
| 2,691,906 | 10/1954 | Finch .................................... | 72/355 |
| 3,466,920 | 9/1969 | Parker ................................... | 72/393 |
| 3,578,036 | 5/1971 | Francois .............................. | 140/107 |

FOREIGN PATENT DOCUMENTS 977,959  4/1951  France ................................. 72/393

Primary Examiner—Lowell A. Larson
Attorney, Agent, or Firm—Biebel, French & Nauman

[57] ABSTRACT

A method of producing a tubular lattice reinforced concrete pipe having a socket at one end including first providing a flat rectangular lattice of longitudinal and transverse members connected at their crossing points, and then forming the flat lattice into a tube; the transverse members are highly ductile and stretchable adjacent one end and this end is expanded to form the socket portion of the reinforcement.

1 Claim, 4 Drawing Figures

U.S. Patent April 4, 1978 4,082,120
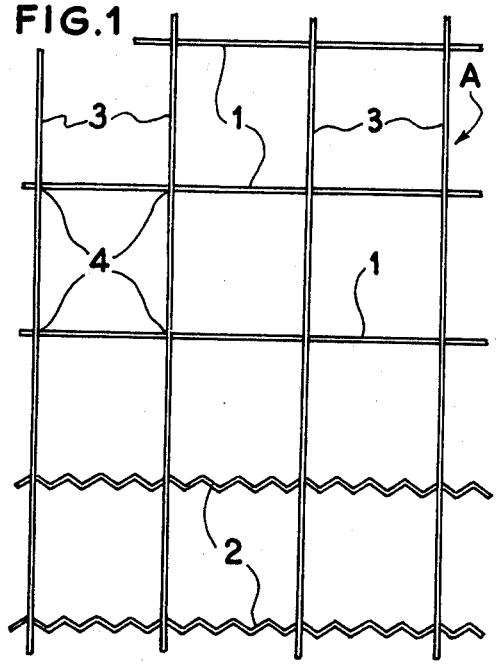
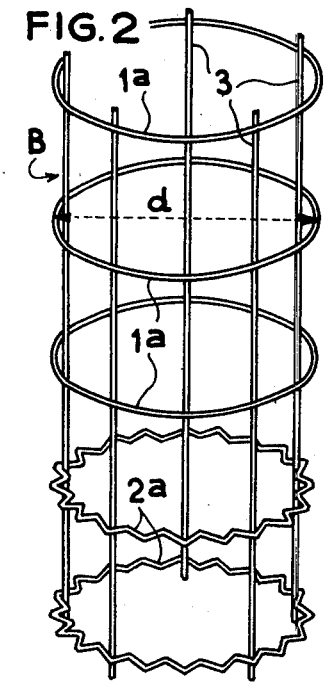
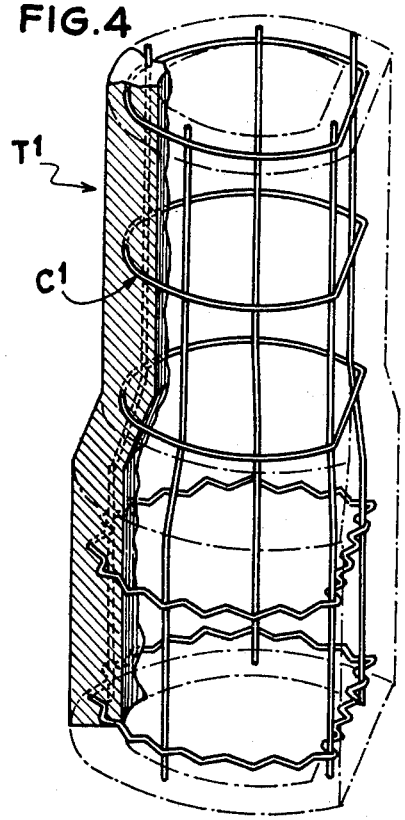
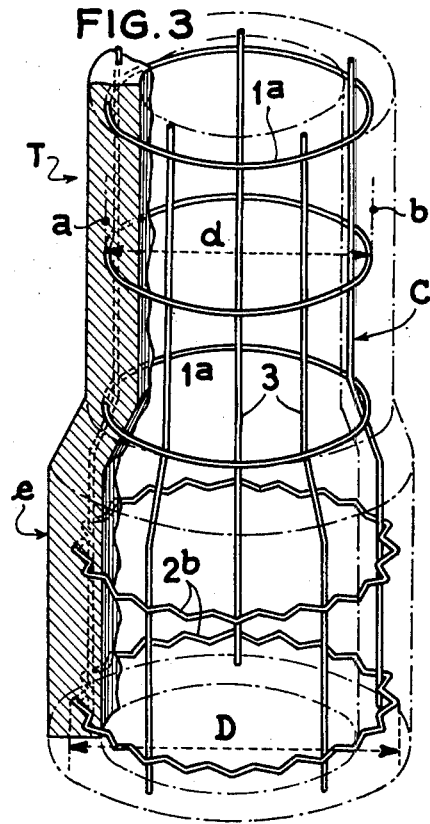

METHOD OF PRODUCING TUBULAR LATTICE REINFORCEMENT FOR REINFORCED CONCRETE TUBULAR PIPE HAVING A SOCKET AT ONE END THEREOF

CROSS REFERENCE TO RELATED APPLICATIONS

This application is a division of my prior copending application Ser. No. 298,321, filed Oct. 17, 1972, which in turn was a continuation of my prior copending application Ser. No. 109,244, filed Jan. 25, 1971, now abandoned, and which in turn was a division of my copending application Ser. No. 808,252, filed Mar. 18, 1969, now U.S. Pat. No. 3,578,036, granted May 11, 1971.

The present invention relates to lattices of welded wires for producing reinforcements for concrete tubular elements having a socket and to the reinforcements and to concrete tubular elements comprising a section of such a lattice.

It is already known to employ a lattice for reinforcing concrete tubular elements including a socket. However, the cross section of the socket is substantially greater than that of the run or body of the tubular element and the best steels do not have sufficient elongation characteristics to permit a large expansion without fracture. Thus, to produce a reinforcement in one piece, there are at present two known methods:

The first consists in avoiding the reinforcement of the socket, the lattice being limited to the body of the tubular element; however, the socket then has a strength which may be insufficient in some cases.

The second method consists in producing the reinforcement in two parts, namely one part for the run or body of the tubular element and a wider part for the socket, the two parts being interconnected by metal wires; however, this method is relatively long to carry out and sometimes delicate owing to the difficulties of centering the part of the reinforcement intended to be embedded in the socket.

The object of the present invention is to overcome these drawbacks.

The invention provides a lattice of welded metal wires wherein a number of the warp wires have successive deformed non-rectilinear portions, the deformations of said portions being permanent and such that, upon exertion of tensile stress thereon, said portions can be at least partially straightened, whereas the other warp wires and all the weft wires are rectilinear.

Owing to their deformed portions, which may form folds, waves, fractions of a coil or any other sinuosities or convolutions, it is possible to elongate the corresponding warp wires and the lattice can undergo, in the portion pertaining to these wires, an expansion in the direction in which the wires extend.

Other objects of the invention are to provide:

a pre-reinforcement obtained from a section of the aforesaid lattice and wherein some of the transverse wires have, starting from one of the ends of the reinforcement and on a portion of its length, a succession of permanently-deformed portions so that the apparent perimeter of said transverse wires is equal to the perimeter of the other undeformed transverse wires, but a real length substantially greater than said perimeter;

a reinforcement having a socket obtained by means of the aforementioned method, said lattice reinforcement having transverse wires bent and closed onto themselves in the form of welded rings and wherein, in the zone of the socket, the transverse wires of the lattice have a trace of partially open deformations;

and a tubular reinforced concrete element having a socket comprising a lattice reinforcement which extends throughout the length of the body and has in the zone of said socket transverse wires which have a trace of partially open or straightened deformations; said tubular concrete element being reinforced by means of a single-piece reinforcement which extends into the whole of the socket.

Further features and advantages of the invention will be apparent from the ensuing description with reference to the accompanying drawing.

In the drawing:

FIG. 1 is a diagrammatic view of a plane section of lattice according to the invention;

FIG. 2 is a perspective view of the same section of lattice after having been bent and welded so as to form a closed cylindrical cage constituting a pre-reinforcement;

FIG. 3 is a diagrammatic perspective view of the final reinforcement embedded in a concrete pipe having a socket, and FIG. 4 is a diagrammatic perspective view of a modification of the reinforcement for a tubular body having an oval cross section including a flat portion.

Reference will first be had to FIG. 1 which shows a section of an improved lattice according to the invention.

This lattice comprises a series of warp wires 1 and 2 and a series of weft wires 3. The wires of the two series intersect at a right angle and are welded together at the crossing point 4. Whereas the warp wires carrying the reference numeral 1 and the weft wires 3 are rectilinear, the warp wires 2 are deformed in alternately opposite directions so as to have successive non-rectilinear portions, either in the form of corrugations as shown, or in the form of folds, loops or other sinuosities or convolution located in the plane or outside the plane of the lattice.

The deformed portions can be continuous, as shown, or interrupted by short rectilinear portions.

The shape of the convolutions, corrugations or other deformations of the wires 2 is so arranged that their amplitude corresponds to the width of the electrodes of the welding machine employed for welding the lattice, since the warp wires and the weft wires are welded at the crossing points.

This shape is also chosen as a function of the total elongation rate corresponding to the necessary expansion.

The same is true as concerns the choice of the steel of the corrugated wires 2 whose elongation characteristic must be considered as a function of the required expansion.

Now, let it is be assumed that it is required to construct a reinforcement for a concrete tubular element T having a socket e (FIG. 3). There is cut from the lattice according to the invention a section A (FIG. 1) whose dimensions correspond to the those of the reinforcement to be embodied in this pipe or tubular element T. This section can be cut at the site of construction of the pipes from a roll of lattice or in a factory and delivered to the side in the flat condition.

This section has, in the direction of the weft wires, the desired length for the reinforcement, whereas in the direction of the warp wires 1, 2 it has a length equal to $\pi d$, in which $d$ is the desired diameter of the body of the reinforcement, that is, the part which is not the socket part (FIG. 2).

The section A of lattice is bent and welded in the form of cylindrical blank or pre-reinforcement B (FIG. 2). In this pre-reinforcement B the warp wires 1 and 2 become transverse circular rings $1^a$ and $2^a$, whereas the weft wires 3 remain rectilinear and embody generatrices of the resulting cylindrical pre-reinforcement B. In this pre-reinforcement B, the rings $1^a$ and $2^a$ have a diameter $d$ roughly corresponding to the mean diameter $ab$ of the wall of the body of the concrete pipe T to be obtained.

Note that the rings $2^a$ formed by the corrugated wires 2 have an apparent perimeter $\pi d$ which is equal to the perimeter of the rings $1^a$ formed by the wires 1 but a real length which is substantially greater than this perimeter owing to their convolutions, corrugations or other non-rectilinear portions.

When employing this pre-reinforcement B benefit is had of the existence of these corrugated portions of wires 2, which constitute a sort of reserve of wire length, so as to restore this reserve by expansion of the rings $2^a$ and afford larger rings $2^b$ (FIG. 3), the diameter D of the rings $2^b$ corresponding to the mean diameter of the wall of the socket $e$ of the pipe and being substantially greater than the initial diameter $d$ which corresponds to the diameter of the rings $1^a$ since the socket of a concrete pipe has a cross section which is greater than that of the body of the pipe.

In order to change from the cylindrical pre-reinforcement B shown in FIG. 2 to the final reinforcement C shown in FIG. 3, the pre-reinforcement B is mounted on an expanding machine for expanding the rings $2^a$. This expansion is achieved by means of a known apparatus, such as an expansible mandrel controlled by hydraulic, pneumatic or mechanical means and inserted in the rings $2^a$.

By means of this apparatus, only the corrugated rings $2^a$ are expanded and undergo both a mechanical circumferential elongation owing to the straightening of the corrugations or other deformations and an intrinsec elongation, that is an elongation in the fibres of the metal. Owing to the "restoration" of the excess length of the corrugations, which were as it were put in "reserve" in the initial lattice, the total elongation of the rings from $2^a$ to $2^b$ can be considerable and in any case substantially greater than the intrinsec possibilities of elongation of uncorrugated wires.

The longitudinal wires 3 are also expanded, near their ends in the connection zone 4 between the expanded part and the non-expanded part. However, this connection zone 4 is of short length so that the natural or intrinsic elongation of the wires 3 is sufficient to permit the deformation.

In this way, the final reinforcement C shown in FIG. 3 is obtained. This reinforcement comprises a number of longitudinal wires 3 embodying the generatrices of the reinforcing cage, a large number of non-expanded circular rings $1^a$ of uncorrugated wire and, in the zone of the socket, a small number of rings $2^b$ of wire which is still more or less deformed, the corrugations, folds or other convolutions not having completely disappeared upon the expansion.

Finally, in order to obtain the reinforced concrete pipe T, this reinforcement C is placed in a mould into which the concrete is poured. The reinforcement is embodied in the concrete. The pouring can be carried out in a static mould or in a centrifugal casting mould.

Thus, it will be understood that the shape and amplitude of the convolutions, sinuosities, corrugations folds or other deformations of the wires 2 must be such that the sum of the intrinsic elongation of the wires 2, due to the characteristics of elongation proper to these wires, and the elongation of "restoration" due to the straightening of the deformations, allows an amplitude of expansion of these wires 2 which is sufficient to produce, without fracture, a reinforcement for a socket having a diameter D substantially greater than the diameter $d$ of the body of the armature.

In view of the fact that for practical reasons the length of wire put in reserve in the deformations is nonetheless limited, the steel of the wires 2 is selected from a quality having an intrinsic elongation characteristic which is sufficient to obtain the expanded perimeter corresponding to the socket of the pipe T after adding the elongation due to the straightening of the deformations. This steel may be, for example and not exclusively, a SIEMENS-MARTIN steel or an oxygen-blown steel. Note moreover that although the uncorrugated wires of the rings $1^a$ and of the generatrices 3 may be bright wires, that is to say, wires hardened by drawing, since they are not intended to be elongated and their elongation characteristics before fracture can be low, the wires 2 may be of a steel having higher characteristics of elongation before fracture and preferably, but not exclusively, non-aging.

Owing to the initial deformation of the wires 2 in the form of sinuosities, convolutions, corrugations or folds, it is possible to elongate them to a substantially greater extent than would be permitted by the intrinsic elongation characteristics of these wires when uncorrugated. Consequently, it is possible to manufacture in one piece a reinforcement for a concrete pipe having a socket by a large expansion of the part of the pre-reinforcement B corresponding to the socket zone of the pipe T intended to be reinforced.

Thus, owing to the invention, it is possible to construct a reinforcement in one piece, which is quicker to produce and employ than known reinforcements in two pieces which are interconnected. This one-piece reinforcement can be more easily bent than reinforcements in two pieces in the mould for the concrete element or pipe.

Further, instead of transporting the reinforcements to the place of manufacture of the concrete pipes, in the pre-fabricated form, which is space consuming and liable to damage the reinforcements in the course of transport, the simplicity of the method according to the invention enables the reinforcements to be constructed on the site, from rolls or panels of lattices which are easy to transport with the minimum of space consumption.

The numerical examples of the following table show the substantial increase in the possibilities of elongation of the lattice wires, owing to the length of wire which is put in reserve in each corrugation and restored by straightening.

This table shows the results of statistics established from many samples having undergone tensile stresses under the conditions prescribed in the "Rules for the use of reinforced concrete BA 68".

The samples were plane lattices of steel wires having a diameter of 3.90 mm; the deformed wires had sinusoidal corrugations whose pitch or wave-length was 30 mm and whose amplitude was of the order of 10 mm.

TABLE

| Type of wire | Load producing the elongation | State of the wire | Elongation % | Remarks |
| --- | --- | --- | --- | --- |
| Ordinary bright mild Martin steel | 645 | uncorrugated | 4–6 | Elongation increases when the width of the meshes of the lattice decrease. |
| | | corrugated | 31–35 | |
| Ordinary annealed mild Martin steel | 390 | uncorrugated | 24–32 | |
| | | corrugated | 45–57 | |

As can be seen, the gain in total elongation obtained with bright wire owing to the corrugations is increased by 25% in absolute value. Its relative value is considerable since it is multiplied by about 6.

The gain in the elongation due to the corrugations with annealed wire is between 21 and 25% in absolute value. It is less in relative value than in the case of the bright wire since the intrinsic elongation characteristics of this wire when uncorrugated are already appreciable.

However, the total elongation is greater for the annealed corrugated wire than for the bright corrugated wire so that it allows a greater expansion than the corrugated bright wire, which corresponds to a greater ratio between the diameter of the socket of the pipe and the diameter of the body of the pipe.

The example described hereinbefore relates to a concrete pipe having a circular section. In the embodiment shown in FIG. 4, the invention is applied to a pipe $T^1$ having an oval section and a flat portion. The reinforcement $C^1$ has a corresponding shape. This shape is applicable in particular to concrete pipes for drains.

The deformations (folds, sinuosities, loops, convolutions or corrugations) can be in the plane of the lattice panel or project from this plane, that is, the deformations can be, in the bent reinforcement cage, in the theoretical surface similar to that of the tubular element and passing through the longitudinal or generatrix wires, or project inwardly or outwardly relative to this theoretical surface and oriented in any way.

Although specific embodiments of the invention have been described, many modifications and changes may be made therein without departing from the scope of the invention.

Thus the invention is applicable not only to tubular elements but also to oval, elliptical or prismatic tubular elements, the reinforcement having an oval, elliptical or prismatic shape.

I claim:

1. A method of producing a tubular lattice reinforcement for reinforced concrete tubular pipe having a socket at one end thereof, the method comprising: providing a flat lattice of longitudinal and transverse members connected together at their crossing points, the transverse members adjacent one end of the lattice being highly ductile and stretchable, forming said lattice into a tubular member, and expanding one end of the tubular member containing the ductile and stretchable transverse members to form the socket portion of the reinforcement.

* * * * *